Patented June 12, 1951

2,556,185

UNITED STATES PATENT OFFICE 2,556,185

ANHYDROUS CAUSTIC SODA PROCESS

Francis Mandeville Joscelyne, Northwich, England, assignor to Imperial Chemical Industries Limited, a corporation of Great Britain No Drawing. Application March 21, 1947, Serial No. 736,424. In Great Britain March 25, 1946

7 Claims. (Cl. 159—47)

This invention relates to a new process for the manufacture of solid anhydrous caustic soda, and more particularly to a new and improved method for the dehydration of relatively concentrated solutions of caustic soda.

The process in commercial operation for the manufacture of solid caustic soda employs a more or less dilute liquor as starting point. This liquor is normally evaporated in a steam heated evaporator until a concentration of about 75% NaOH is reached. This evaporation is frequently carried out, in the later stages at least, under reduced pressure. From this stage on it is not practicable to employ steam heating as a means of continuing evaporation because of the very rapid rise in the boiling point of caustic soda solution with increasing concentration, and the conversion of 75% NaOH to anhydrous caustic soda is a much more difficult problem than the evaporation of dilute liquor up to 75% NaOH. For example, a 75% caustic soda solution boils at atmospheric pressure at slightly below 200° C., whereas a 90% solution boils at above 260° C. and a 97% solution boils at above 340° C. Commercial practice generally involves evaporation by direct heating of these liquors in pots at atmospheric pressure, and in this process the liquor temperature rises progressively during evaporation and must be taken up to about 400° C. over a period of 36 hours in order to remove the last traces of water. The rate of operation is limited largely by the rate at which the necessary heat can be got into the caustic liquor. Thus direct fired pots involve considerable heat input at high temperatures (at least 360 ton calories per ton of anhydrous caustic soda), which is an inefficient way of employing heat and a very inefficient means for transferring the heat from the fuel.

The heat efficiency of the caustic pot is only some 46%, and in addition the large floor space occupied and the relatively large amount of repairs makes pots even more unattractive.

Much effort has therefore been expended in trying to improve upon the conversion of 75% and similar concentrated liquors to anhydrous caustic soda. Attempts have been made to adapt methods used at lower concentrations for evaporation from 75% up to anhydrous fused caustic soda. One method has been the evaporation of these liquors in a conventional type of tubular evaporator or in a forced circulation evaporator, using heating media other than steam, more particularly diphenyl vapour or mercury vapour. The high temperatures involved render the use of diphenyl vapour unattractive for making anhydrous caustic soda, because of the tendency for this expensive transfer material to decompose, but it can be used for making 90–95% NaOH liquor satisfactorily. With mercury vapour the materials available for plant construction are limited and it is difficult to find a material which will stand up to the severe conditions of service with mercury on one side as heating medium and highly concentrated caustic soda liquor on the other side.

Attempts have also been made to carry the evaporation beyond 75% NaOH under reduced pressure instead of in open pots. In this case, crystallisation occurs when the melt contains between 80% and 93% of caustic soda, even with the use of a moderate vacuum, because of the lowering of boiling point. Heat can only be transmitted to solid substances slowly and irregularly, and the difficulty of transferring heat to such solids has therefore been avoided in vacuum evaporation processes by varying the vacuum during the concentration in such a manner that the boiling point is kept above the point of incipient crystallisation of the solution. Attempts have also been made in the past to reduce the amount of heat involved by crystallising anhydrous caustic soda from solution. For example, a 90% NaOH liquor can be cooled to give a magma of crystals and mother liquor by centrifuging.

A process has also been evolved for evaporating caustic liquor under reduced pressure in a conventional tubular type of steam heated evaporator, or better still in a forced circulation evaporator, under conditions such that crystallisation occurs in the evaporator. The magma so produced is removed from the evaporator and the crystals are separated by centrifuging and drying. The process is difficult to operate because circulation in such evaporators is difficult when there is more than a small proportion of solid in the suspension inside the evaporator, and the evaporators tend to scale or block because the evaporation causes formation of several parts of solid per part of water evaporated. Furthermore, it will readily be appreciated that the centrifuging of a highly caustic material is a dangerous proceeding, and both the centrifuging and drying of a desiccating agent like caustic soda are difficult to carry out. Methods have also been suggested for overcoming serious embrittlement and corrosion of vessels which occurs when they contain these highly concentrated caustic soda solutions at the high temperatures which are used for evaporation. As long ago as 1905 it was suggested that caustic pots be worked under reduced pressure so as to reduce the temperature of evaporation, even below the melting point of caustic soda, in order to reduce the attack on the pots, e. g. see United States Patent 971,144. For example, it has been suggested that starting with 50 to 55% NaOH solution the evaporation be carried out with stirring under reduced pressure at 180°. This suggested method causes the solution to densify and finally become a solid which is nearly anhydrous, containing at most 10% of water. This method involves heating a liquor which gradually becomes a suspension, then a wet solid and finally an early dry solid. The addition of heat to a solid is much more difficult than to a liquor because of the very poor heat transfer obtainable. The amount of heat to be added is 100 ton calories per ton of caustic soda in converting the saturated solution to a dry solid, and this has to be put in under the unfavourable heat transfer conditions. For example, the heat transfer coefficient through the walls of a direct fired vessel containing liquor in motion is generally of the order of magnitude of 1000 kilocals per m$^2$ of surface per hours per °C. temperature difference, whereas when the same vessel contains a stirred solid the heat transfer coefficient is only about one-tenth of this figure.

No completely satisfactory procedure for the dehydration of aqueous caustic soda solutions which provides a product having satisfactory properties at a desirable expenditure of heat has been developed heretofore because of difficulties which are peculiar to caustic soda and the treatment thereof. Complicating difficulties include the serious attack and corrosion of containers by the caustic soda, the discolouration produced in the product by even minute amounts of impurities, the highly deliquescent nature of caustic soda, and the complexity of working with a substance which is so liable to be dangerous to the operators. Probably the most peculiar difficulty, however, with respect to the dehydration of caustic soda, is the extreme difficulty with which the final portions of water are removed by fusion at high temperatures or alternately, at low partial water vapour pressures, the procedure is extremely difficult because of complicated heat problems. However, even if the caustic soda is deposited in the form of crystals from solution, e. g. such as by the process described in U. S. P. 1,907,988, the plate-like form of the caustic soda crystals makes the handling of the resulting suspension extremely difficult so that commercial centrifuging of such suspensions is nearly impractical and even then the centrifugal caustic soda crystals are difficult to dry because of their very deliquescent characteristics.

An object of this invention has been to overcome the many difficulties inherent in and peculiar to the evaporation of caustic soda solution. Another object has been to prepare granular solid anhydrous caustic soda. A third object has been to reduce the amount of heat required to convert caustic soda solution to solid anhydrous caustic soda, and to provide an autoevaporation process. Yet another object has been to dispense with the slow process of evaporation in pots with its consequent high fuel, labour and repair costs. Other objects appear hereinafter.

I have found that there are certain conditions in the high range of concentration which, if properly chosen, can be employed for the conversion of caustic soda solution to solid anhydrous caustic soda and water vapour without the introduction of anything like so much heat as has hitherto been thought to be essential. Within certain narrow ranges, highly concentrated solutions of caustic soda at or slightly above the temperature at which they are saturated, when subjected to reduction of pressure undergo separation into water vapour and anhydrous crystals, and the process continues to completion adiabatically.

In one method of carrying out this invention, I take a solution containing about 10% water and the rest caustic soda except for small amounts of impurities which may amount to ½% to 1% taken together. The temperature of this solution is adjusted to about 280° C. The solution is then subjected to conditions in which the partial water vapour pressure above the solution is kept below 600 mm. of mercury, e. g. is kept at 100 to 400 mm. of mercury, and a large surface area of solution is provided, e. g. by spraying the solution down an empty tower. This permits autoevaporation of the water and the caustic soda is thus deposited as a granular, dry anhydrous solid by these operations alone. The above description represents the optimum case where it is unnecessary to introduce any heat whatsoever, and the only heat precautions which must be taken are that undue losses to the atmosphere must be avoided.

Another method of operation is to spray an appropriate solution down a tube in which there is an ascending current of air to carry off the water vapour and thus maintain a low water vapour partial pressure. This method also gives dry granular anhydrous caustic soda. The air should be warm to avoid undue heat losses from the solution, and it may if desired be hot enough to supply some heat to the process.

The method of providing a large surface area may be by any of the standard methods normally adopted for this purpose, e. g. spraying, exposing as a film, agitating a solution or distributing it on previously produced granular caustic soda as carrier for the solution in a creeper mixer. In any of these processes the time involved in autoevaporation is extremely small relative to the times normally taken in evaporating caustic soda solution.

In my process, I avoid the consumption of much of the heat normally required in a pot finishing process, most of the corrosion difficulties, and a lot of the time required. By crystallising caustic soda from a solution to give a solid product at or below 270° C. instead of forming it as a fused product at 400° C. from the solution, I save more than the latent heat of fusion of caustic soda—approximately 130 ton calories per ton caustic. By avoiding corrosion I dispense with the settling operation for removing impurities which get into the liquor during the last stages of evaporation, and I also dispense with the need to heat up fused caustic soda from the final evaporation temperature of about 400° C. to the temperatures essential if satisfactory settling is to be obtained, e. g. 500° C. This saves a further 55 ton calories plus all the heat losses during the 36 hours settling at high temperatures. In addition, the evaporation which I do to give my initial liquor can be carried out under the more attractive heat transfer and recovery conditions of a conventional forced circulation tubular type evaporator because the temperatures required for evaporation up to 80 to 95% caustic soda are attainable by means other than direct firing, e. g. by the use of diphenyl vapour.

Thus it will be seen that our invention comprises adiabatic or substantially adiabatic conversion of an appropriately chosen solution into vapour and solid merely by subjecting it to the necessary reduction of partial water vapour pressure. In the ideal case this adiabatic process is also an isothermal one.

The success of my invention is due in a large extent to the discovery that the heat required for vaporising the water from a caustic soda solution of certain specific concentrations can be provided by the heat liberated from crystallisation of anhydrous caustic soda from such solutions. Thus, I have found that the crystallisation of caustic soda from highly concentrated solutions liberates considerable heat notwithstanding the well known fact that the dissolution of caustic soda in water liberates a very large amount of heat. Moreover, I have discovered that with specific conditions this crystallisation liberates enough heat to vaporise all of the water from these concentrated solutions. By operating in this fashion, anhydrous caustic soda containing substantially no water can be obtained even though the caustic soda is extremely deliquescent. In other words, this discovery makes possible production of substantially anhydrous caustic soda by overcoming many of the difficulties and peculiar problems associated with the dehydration of caustic soda, e. g. the complicated problems of heat transfer are dispensed with since by operating under my conditions the heat required is actually generated internally as required.

The ideal case is represented by the use of about 90% to 92% caustic soda solution at about 270° C., but there are other conditions within the immediate vicinity of this point where the operation though adibatic is not isothermal in that some raising or lowering of the temperature occurs during the autoevaporation. As the higher limit I can start with solutions containing as much as 95% NaOH at a temperature of 290° C. In this case, despite the absence of any input of heat, the temperature actually rises during this autoevaporation process, but this rise of temperature is accompanied by a fall in vapour pressure as the water is removed during the autoevaporation process, and with such high starting concentrations the final partial vapour pressure for adiabatic autoevaporation to occur should not exceed 100 mm. As a lower limit I may use liquor containing 85% caustic soda with an initial temperature between 250° to 370° C., but except at the higher temperatures in this range the temperature drops during adiabatic autoevaporation and at the same time the partial water vapour pressure also must be kept down, in some cases down to 50 mm. mercury. Thus I have a comparatively restricted range of concentrations in which my process operates without the introduction of any heat. Within this general range of 85% to 95% NaOH, the preferred concentrations lie between 87% and 92% range, and for the 87% liquor it has been found preferable to start with a temperature between 230° and 270° C., and for the 92% liquor it has been found preferable to start at a temperatures between 270° and 300° C.

Whilst this invention has hitherto been described as an adiabatic process which in the ideal case is also an isothermal process, I include within the present invention the substantially adiabatic process where some heat is added but only a small amount relative to that which has hitherto been thought necessary. The conversion of 90% caustic soda solution to fused anhydrous caustic soda and water vapour by the conventional pot process involves the transfer to it of about 150 ton calories per ton of caustic soda. I have shown that I can carry out this dehydration without the introduction of any heat by making a solid product under specified conditions, but for simplification in operation it is sometimes desirable to add an amount not exceeding 80 and generally not exceeding 40 ton calories per ton of caustic soda. This is conveniently applicable when the process is carried out in a creeper mixer. I also include the case where a small amount of heat is lost, for example by radiation from the substance or from the walls of the vessel, or by transmission to cool air used to effect autoevaporation.

In one method of carrying out the process as a continuous process in a creeper mixer I employ a steam jacketed paddle creeper which is open at the top for access of air. The paddle creeper contains granular caustic soda, and a 90% caustic soda liquor at a temperature of 260° C. is fed in at one end of this creeper. A pool of liquor thus forms at the feed end, and further along the creeper the contents become mushy and subsequently become dry, and eventually free-flowing anhydrous granular caustic soda runs off at the far end. Although theoretically there is no essential need to introduce heat into this creeper process, yet I find it convenient to heat the walls of the creeper, and/or to see that the air which passes freely over the surface of the solid in the creeper and thus removes the water vapour is hot, e. g. at 150° to 300° C. In practice, of course, the amount of heat which can be transferred through the metal surface to a mushy solid or to a substantially dry or free-flowing solid as is present in the creeper is extremely small because of the resistance to heat flow from the creeper walls to the solid. Thus only a negligible amount of heat is put in through the walls of such a creeper by comparison with the heat which can be put into a liquid in a similar sized vessel heated in the same way. Yet despite this, the operation which I have described takes only some 1 to 2 hours for the conversion of 90% liquor to dry anhydrous solid containing less than 0.3% water, whereas the conversion of 90% liquor to fused caustic soda on the same scale normally takes at least 8 hours, even with a much brisker fire in the latter case than in the former. In the case where I do not use strictly adiabatic operation but provide some heat either through the walls or by contact with hot air, I can with a rather longer time of operation manage to use a feed liquor containing as little as 80% NaOH.

According to the present invention, therefore, I provide a process for producing solid anhydrous caustic soda from a solution which consists in bringing a highly concentrated solution to a temperature between 200° and 300° C. and thereafter providing a large surface area of the liquor and a low partial water vapour pressure to facilitate vaporisation of the water, and substantially adiabatically allowing the vaporisation to yield solid anhydrous caustic soda. The solution employed is of a concentration at or near saturation at these temperatures. The process may be carried out for example by spraying an 85% to 95% NaOH solution at 250° to 300° C. into a vacuum, or by spraying an 80% to 95% NaOH solution at 200° to 300° C. through a current of hot air, or by feeding an 80% to 95% NaOH solution into a vessel containing granular caustic soda which is being agitated while air passes over it, or by spreading the liquor as a thin film.

Characteristic features of the invention are firstly the substantially adiabatic nature of the operation, thereby avoiding the difficult process of heat transfer to a solid, viscous solution, or slurry, and secondly avoiding the high temperature conditions involved in the making of fused caustic soda. Simultaneously, another characteristic is that the liquor does not continuously get stronger until it reaches 100% fused NaOH, as is the case in the conventional pot process, but during the autoevaporation solid separates out and the solution remains substantially unchanged in composition until it dries up. There is thus a discontinuity, and the autoevaporation causes at this discontinuity a progressive reduction in the amount of solution but not a material change in its composition, and a progressive increase in the amount of solid anhydrous caustic and in the amount of water vapour removed. Thus the solution dries up giving a solid caustic soda which has not been molten. Unlike the established process, there is a top temperature which must not be exceeded in carrying out this operation and this is approximately 300° C. Even this temperature is too high for the full benefits of the process to be attained, and it is preferred that the top temperature shall not exceed about 270° C.

By way of expanation of the fact that I carry out my process under the ideal conditions of adiabatic autoevaporation at the point where solid is being precipitated, I believe that the ideal conditions are those at which saturated aqueous solutions of caustic soda show a maximum in the curve of vapour pressure against temperature. It has already been known that the vapour pressure of saturated caustic soda solutions rises with increasing concentration up to between 80 and 93% NaOH, and then falls again. I have shown that this curve reaches a maximum at or just below 600 mm. of mercury, corresponding with 90% to 92% NaOH and 260° to 280° C., and then drops with further rise of concentration and temperature. At this maximum the heat required to convert a saturated solution to water vapour and solid caustic soda at the same temperature is nil. In respect of this vapour pressure of saturated aqueous solutions caustic soda differs from most other inorganic substances. Only a few substances have such a maximum, and without this maximum there can be no adiabatic isothermal autoevaporation. Of these few substances caustic soda is the only anhydrous substance I know which has such a maximum just below atmospheric pressure. This vapour pressure is low enough to operate a granulation process to give a dense product without using closed pressure vessels and yet is high enough to cause a high rate of evaporation in my process without the need for large volumes of carrier fluid such as air to remove the water vapour. Those factors which I have determined have been found by me to be requisite in practice for the ready operation at high rates of an adiabatic evaporation process under the conditions I have described herein.

This presents yet a further advantage of the process in that all the final and difficult dehydration is carried out without, in the ideal case, any fall in vapour pressure from this maximum figure. That is to say, the last of the water present exerts a vapour pressure of nearly 600 mm. of mercury and thus is readily removed. With other crystallisation processes much smaller pressures are exerted by the final portions of water, and with a fusion process the temperature must be raised to 400° C. to give sufficient vapour pressure for the last drops to vaporise.

The invention also provides a further characteristic feature in the form of the product. The product is generally obtained as a granular dust-free material of less than 1% and generally less than 0.3% water content, somewhat resembling in appearance a coarse sand or aggregates thereof. It will readily be realised that this is a much more attractive product commercially than the solidified fused material which is so difficult to handle. Depending on the type of process employed, the bulk density of the solid product may vary between 0.4 and 1.3 gm./cc. When I carry out the evaporation by spraying the solution into an evacuated tower the evaporation takes place by rapid disintegration of the sprayed drops and consequent formation of hollow or porous granules whose packing density is between 0.3 and 0.8 and is generally 0.4 to 0.6 gm./cc. For commercial and domestic purposes a low density is often an attractive feature especially with a highly reactive material like caustic soda, and it simplifies the addition volumetrically of small weights of the material in processes where caustic soda is used. When I spray the liquor down a tower counter-current to an upflowing stream of warm or hot air the granules so obtained are approximately the size of sand and their packing density is generally 0.7 to 0.9 gm./cc. When I carry out the process in a granulator in contact with air the product is in dust-free granules which may even exceed 2 mm. in diameter, and the bulk density is 0.9 to 1.5 and generally about 1.1 to 1.3 gm./cc. All such products are themselves novel and useful. They are all more readily handled, measured and dissolved than the usual commercial product.

It should be noted that my process does not merely consist in evaporation under reduced pressure at stated temperature by continued heating. It consists in the use of solutions of appropriate temperature and concentration which are obtained by evaporation, if desired under reduced pressure, and in subjecting them to an appropriate reduction in partial water vapour pressure. The mere continuation of evaporation under the partial pressure employed for making the necessary starting liquor would not cause drying up of the solution to occur in the manner of this invention without the simultaneous input of about 100 ton calories per ton caustic soda, depending on the temperature and pressure used, under difficult conditions of heat transfer to a slurry and then to an apparently dry solid. I so adjust my conditions and then reduce my partial pressure so that the input of heat, if any, does not exceed 80 ton calories, and put most of such heat as is required into a liquor under good conditions of heat transfer and thus save in consumption of heat and in time of operation also.

The process can clearly be carried out as a batch process, but in industrial operation it is much more convenient to carry it out as a continuous process as, for example, in apparatus of the creeper type. The process presents the advantage that it is operated at a relatively low temperature and therefore the attack on materials of which the plant is constructed is less. For example, mild steel can be used for the construction of the plant if slight discolouration from the pure white is permissible. Cast iron is also eminently satisfactory. If a pure white product is required, more resistant materials include silver linings for the vessels or vessels made of nickel. In addition, attack on the vessels during the present process can readily be avoided by producing a thin layer of scale on the surface of the vessel and any stirrers or other metallic parts. This thin layer of scale may be readily deposited from the solution used in the process by filling the vessels with this solution and causing slight cooling. The scale so formed is adherent and permits the manufacture of white caustic soda.

The invention is illustrated but not restricted by the following examples.

*Example 1*

The apparatus used in this example consists of a vertical tower 3 feet in diameter and 15 feet high, equipped at the bottom with a tray which can be emptied through a doorway, and at the top with a spray nozzle feed through a control valve from a stock tank. Apart from these features, the tower is empty and is closed to the atmosphere and connected through a condenser to a vacuum pump. In the process, the absolute pressure inside the tower is reduced to 5 lbs. per square inch by means of the vacuum pump. The stock tank is filled with a liquor containing 89.5% NaOH, 10% $H_2O$, and 0.5% of sundry impurities including $Na_2CO_3$ and NaCl, which has been heated to 280° C. The control valve is then opened to admit liquor at a rate of 200 litres per hour. The liquor may be observed through windows in the walls of the tower and is seen to emerge from the spray nozzle as multitudinous droplets. As these droplets fall in the tower they change to a solid and collect on the tray in the manner of a snowfall. When the tray is full, the liquor feed valve is closed, the vacuum is released, the tray is emptied into a container and the operation restarted. The product so obtained is much too hot to handle manually when removed from the tower, and when cold is found to contain only 0.2% $H_2O$. It has a bulk density of .4 to .5 gram per cc. Nicroscopically the structure of the solid can be observed to be jagged and shredded.

The operation described above is a batch process and it is made continuous by incorporating a continuous removed device for the product. One such device is an electrically heated extrusion pump which delivers a mush of partly melted crystals continuously. Another device involves melting the product on the tray and pumping out the fused caustic soda.

It is to be noted that in this example the evaporation is carried out without any application of heat whatsoever, and at an industrially practicable vacuum, and without deleterious fall of temperature, while the anhydrous product is obtainable directly without centrifuging or other means for separation, from mother liquor. Furthermore, the time required for evaporation is merely the time of fall through 15 feet—about 1 to 3 seconds.

*Example 2*

In this example the apparatus consists of a vertical tower of 5 feet diameter and 30 feet high, equipped with a band conveyor at the bottom for removal of the product, atomising spray nozzles at the top for introduction of the liquor as fine droplets, an inlet pipe near the base for introduction of hot air, and outlet at the top for removal of the moisture-laden air. The spray nozzles are fed by a pump from a stock tank. The stock tank is filled with liquor containing 92% NaOH, 7.5% $H_2O$ and the remainder impurities principally NaCl and $Na_2CO_3$. This liquor is kept at 280° C., and is pumped through the spray nozzles into the tower at a rate of 250 litres per hour. Simultaneously, air is blown into the bottom of the tower at 250° C. and at a rate of 150 m.$^3$ per hour, and evacuated from the top along with the water vapour evolved. Hot, granular caustic soda collects on the band conveyor and is removed and packed. It has a bulk density of 0.8 gram per cc., and its water content is 0.6% by weight.

*Example 3*

In this example is illustrated the drying of liquor from crystals of caustic soda. The crystals are obtained by crystallisation according to the known process and centrifuged, and they contain 3% $H_2O$. These crystals are fed into a tube inclined at an angle of 10° to the horizontal and rotating at 50 R. P. M. A slow current of warm air is passed through the tube, and the tube is heated so as to maintain the crystals at 250° to 280° C. On heating under these conditions for half an hour the product leaving the tube contains only 0.1% $H_2O$. For comparison, if the same material is treated in the same apparatus at a higher or a lower temperature, a substantially longer time or bigger current of warm air is required to effect the same drying. For example, at 310° C. or at 150° C. several hours are required under otherwise similar conditions.

*Example 4*

The equipment consists of an inclined trough 2 feet wide and 2 feet deep, fitted with a rotating paddle mixer, and gently heated externally along its whole length of 12 feet. The liquor employed contains 87% NaOH and 13% $H_2O$ and is used at a temperature of 220° to 270° C. Air is allowed to circulate freely over the top of the open trough, and heating of the trough is necessary in order to overcome the heat losses to this air. The trough is substantially filled with solid granular caustic soda (about 10 cwts.), and liquor is then run into the feed end of the trough continuously at a rate of .2 m.$^3$ per hour. This causes the formation of a mushy puddle at the point where liquor is added, and the contents of the trough vary from this mush through a wet solid, a dry-looking solid, to a dry free-flowing anhydrous solid at the discharge end. Dry solid caustic soda in a form resembling coarse sand and aggregates thereof then leaves at the exit end of the trough. It contains 0.1% $H_2O$, has a bulk density of 1 to 1.1 grams per cc., and is free-flowing and free from dust.

*Example 5*

The apparatus consists of a polished drum 2 feet wide and 6 feet diameter, rotating slowly on a horizontal axis with the bottom portion immersed to a depth of 6 inches in a bath of liquor. The bath contains 89% NaOH liquor at 280° C. The drum rotates at one revolution per minute, and picks up a thin layer of solution on the surface which rises out of the solution. As the solution is exposed to the atmosphere on the rotating drum, the water evaporates leaving a layer of solid anhydrous caustic soda, which is scraped off as flakes on the downgoing side of the drum.

*Example 6*

In this example a batch is illustrated. The apparatus consists of an open stirred pot externally heated with oil at 270° C. This pot is half-filled with 89% NaOH liquor. During this heating and stirring the liquor gradually thickens due to loss of water vapour to the air which passes freely over the top of the pot. It becomes first a slurry and then a moist solid, which gradually dries and crumbles. Finally it becomes a dry free-flowing granular solid of particle size chiefly between .2 mm. and .5 mm. This is anhydrous caustic soda containing 0.1 $H_2O$. The time required for this operation is of the order of one hour. For comparison, the conventional method of evaporating in a pot to give fused caustic soda involves the use of a heating medium at a much higher temperature, e. g. flue gases at 900° C., and takes 6 hours under otherwise similar conditions because of the large amount of heat required.

What I claim is:

1. A process for the manufacture of solid substantially anhydrous caustic soda from an aqueous solution thereof which comprises heating an aqueous caustic soda solution of between 80% and 95% caustic soda content to a temperature between 200° C. and 300° C., then providing a large surface area of the heated solution, subjecting the solution to a partial water vapour pressure of less than 600 mm. of mercury, and substantially adiabatically allowing the solution to yield solid anhydrous caustic soda.

2. A process for the manufacture of solid substantially anhydrous caustic soda from an aqueous solution thereof which comprises heating an aqueous caustic soda solution of between 90% to 92% caustic soda content to a temperature between 260° C. and 280° C., then providing a large surface area of the heated solution, subjecting the solution to a partial water vapour pressure of less than 600 mm. of mercury, and substantially adiabatically allowing the solution to yield solid anhydrous caustic soda.

3. A process as claimed in claim 1, wherein said solution contains between 85% and 95% caustic soda with the remainder being water except for impurities.

4. A process as claimed in claim 1, wherein said large surface area is obtained by spraying said solution at a temperature of 200° C. to 300° C. into a vacuum, and solid caustic soda is collected.

5. A process as claimed in claim 1, wherein said large surface area is obtained by spraying said solution through a current of hot air and solid caustic soda is collected.

6. A process as claimed in claim 1, wherein said large surface area is obtained by feeding said solution into a vessel containing granular caustic soda agitated therein, said partial water vapor pressure is maintained by allowing air to pass over the agitated mixture and solid caustic soda is collected.

7. A process as claimed in claim 6, which is carried out continuously in a rotating paddle mixing machine.

FRANCIS MANDEVILLE JOSCELYNE.

REFERENCES CITED

The following references are of record in the file of this patent:

UNITED STATES PATENTS

| Number | Name | Date |
|---|---|---|
| 971,144 | Reitz | Sept. 27, 1910 |
| 996,832 | Campbell | July 4, 1911 |
| 1,006,823 | Block | Oct. 24, 1911 |
| 1,852,303 | Heath | Apr. 5, 1932 |
| 1,907,988 | Lynn et al. | May 9, 1933 |
| 1,927,555 | Oetken | Sept. 19, 1933 |
| 1,956,138 | Staib | Apr. 24, 1934 |
| 2,022,037 | Hanchett | Nov. 26, 1935 |
| 2,109,811 | Welter | Mar. 1, 1938 |
| 2,123,661 | Petersen | July 12, 1938 |
| 2,353,459 | Gruber | July 11, 1944 |

OTHER REFERENCES

Perry: Chemical Eng. Handbook, 2nd edition, 3rd impression, McGraw-Hill, 1941, pages 1761, 1804, 104.

Industrial & Eng. Chemistry, vol. 23, No. 2, February 1936, pages 247, 248.